July 29, 1958  S. BRUMBERGER  2,844,895
PROJECTION SLIDE CHANGING DEVICE
Filed Feb. 4, 1957  5 Sheets-Sheet 1
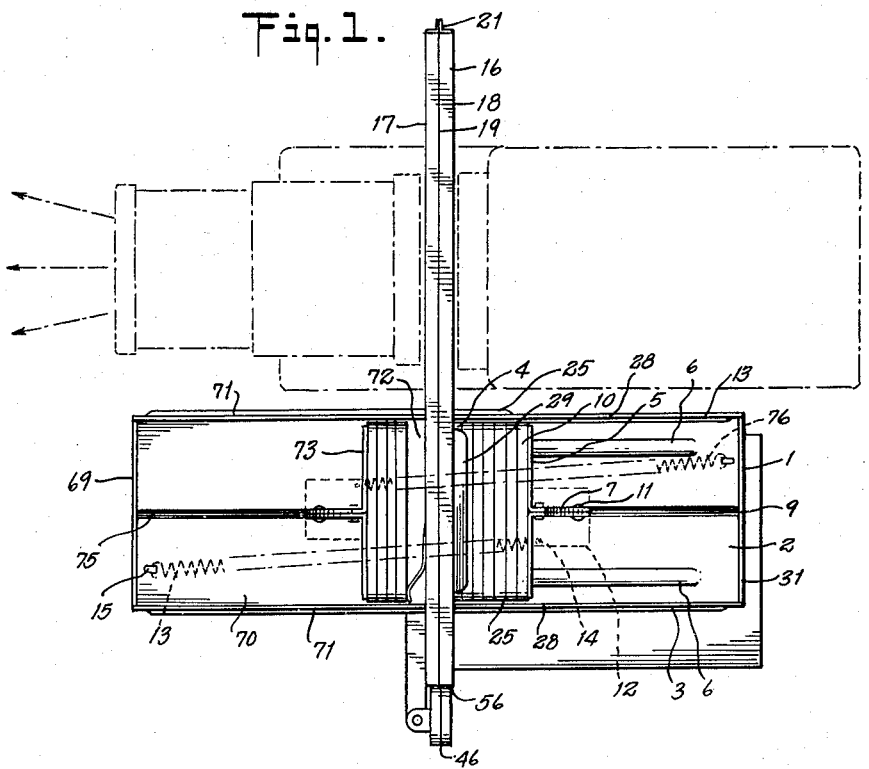
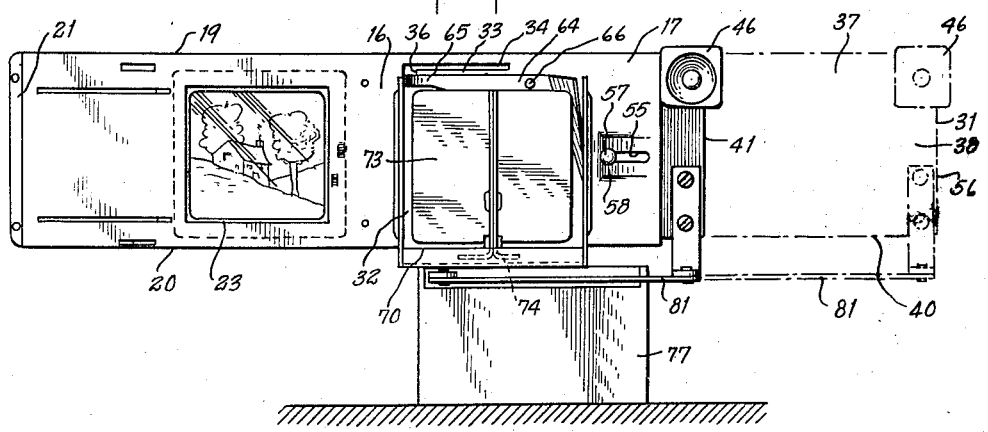
INVENTOR.
SYDNEY BRUMBERGER
BY
Kenyon & Kenyon
ATTORNEYS July 29, 1958 S. BRUMBERGER 2,844,895
PROJECTION SLIDE CHANGING DEVICE
Filed Feb. 4, 1957 5 Sheets-Sheet 2
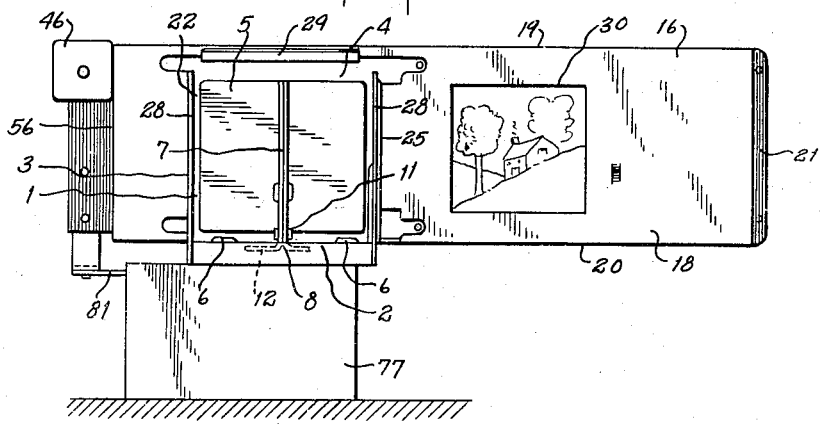
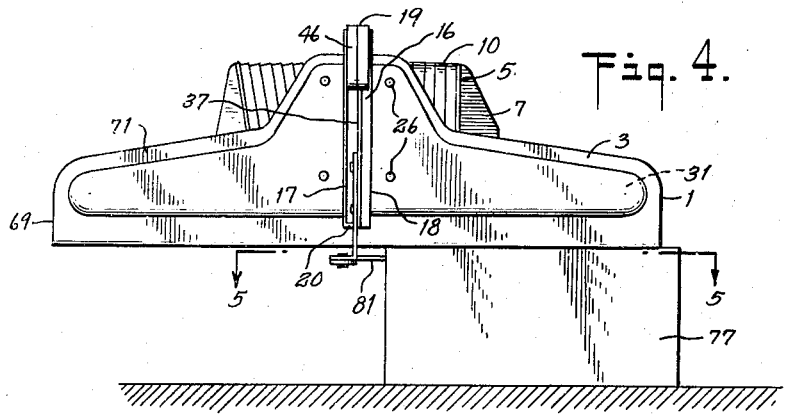
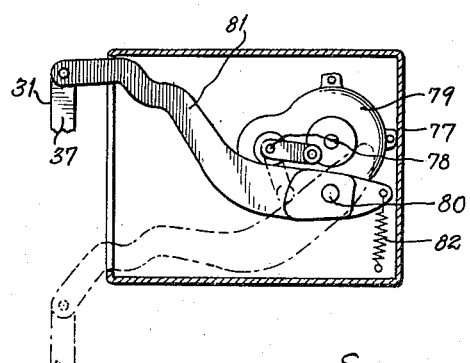
INVENTOR.
SYDNEY BRUMBERGER
BY
Kenyon & Kenyon
ATTORNEYS

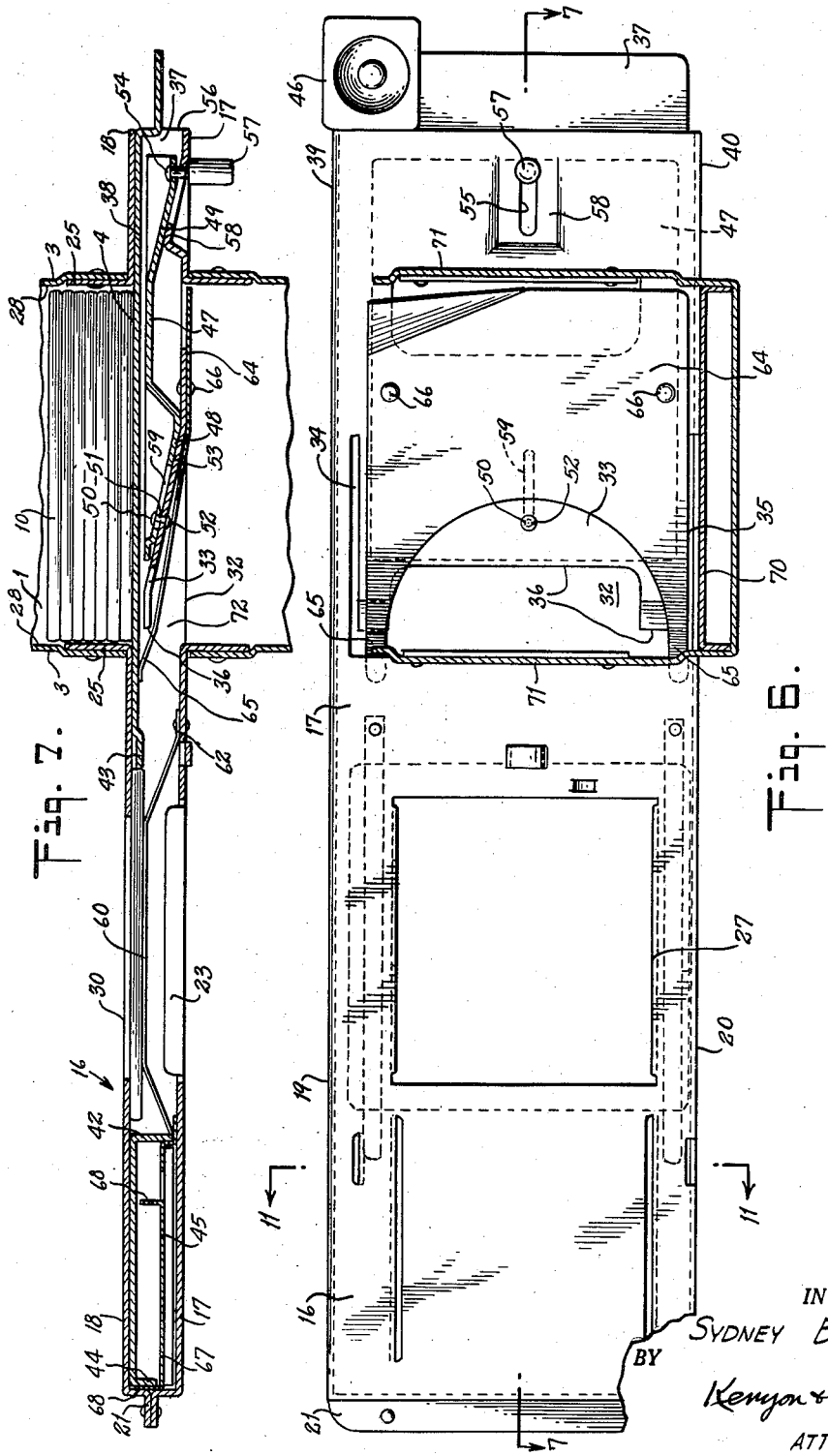

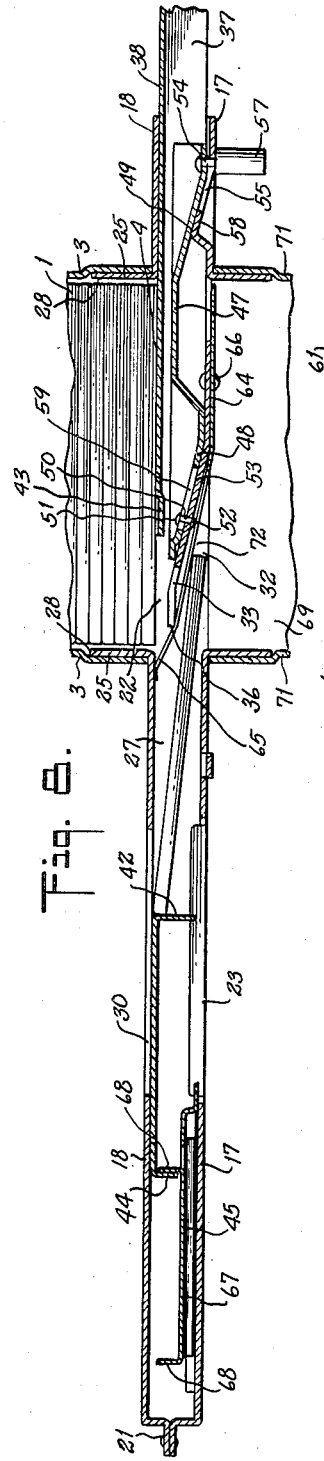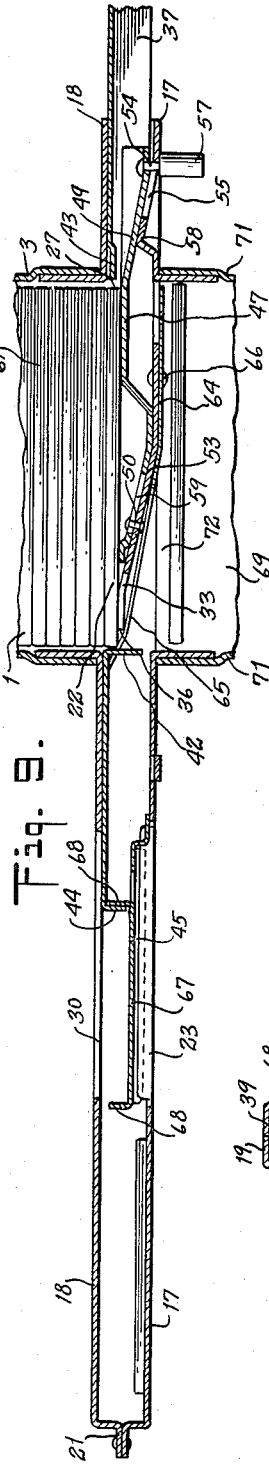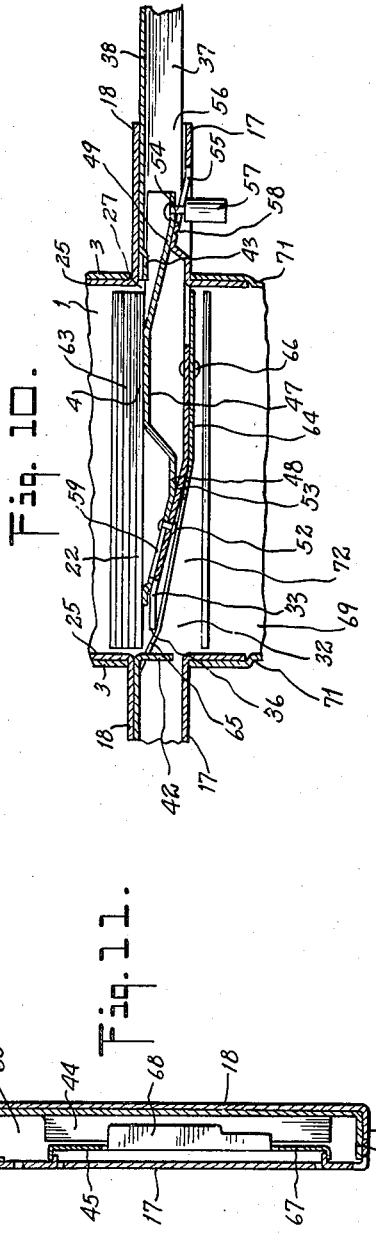

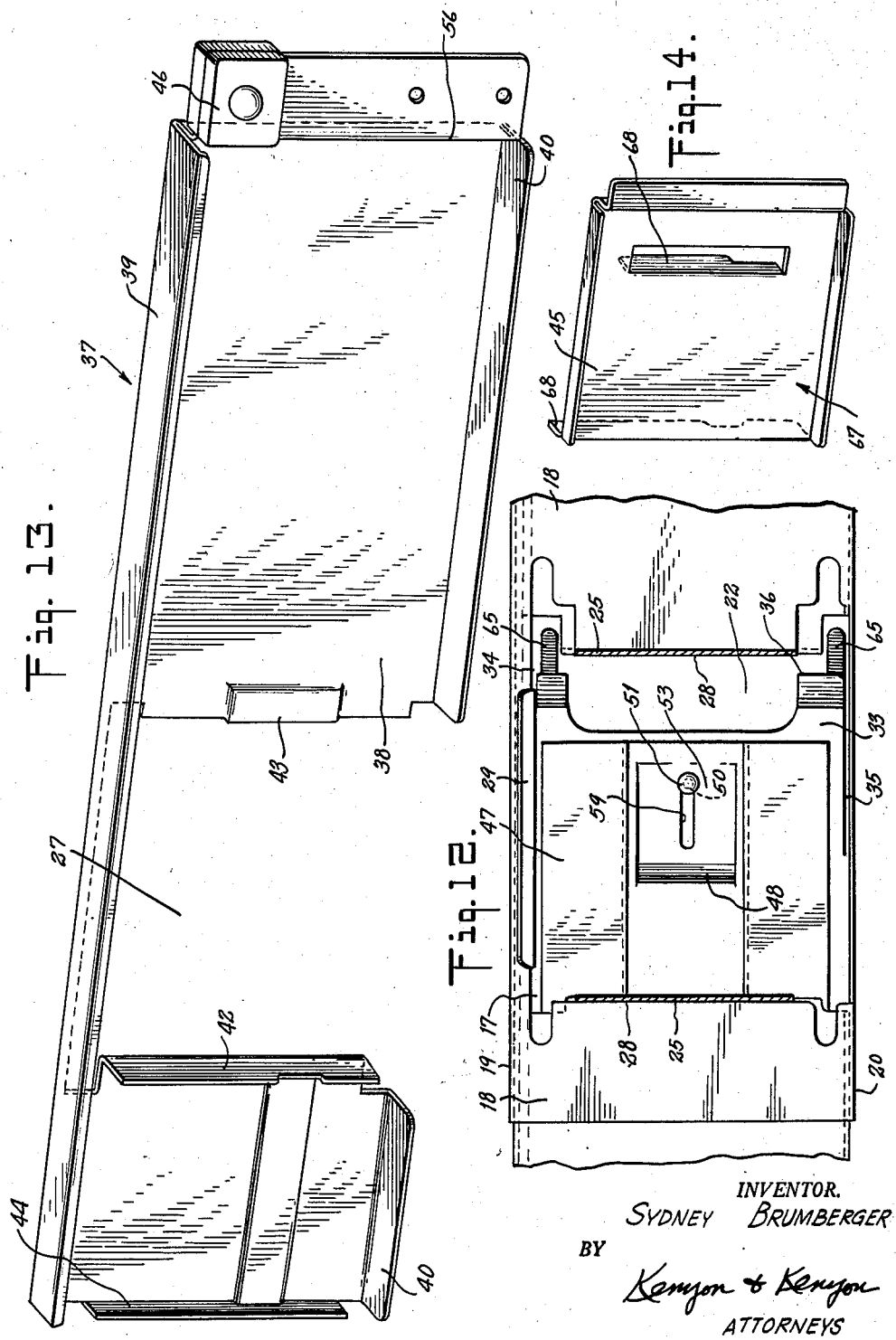

… … …

United States Patent Office 2,844,895
Patented July 29, 1958

2,844,895

PROJECTION SLIDE CHANGING DEVICE

Sydney Brumberger, Lawrence, N. Y.

Application February 4, 1957, Serial No. 638,011

7 Claims. (Cl. 40—79)

The present invention relates to a slide changing device which is for use in conjunction with a slide projector. More particularly the invention relates to a slide changing device which receives slides of varying thicknesses and transfers them one at a time to a projection position.

It is well known today that projection or lantern slides differ in construction and more particularly they vary in their thickness. The variety of slide thicknesses is generally attributable to the manner in which the picture carrying element of the slide is mounted. For instance, the picture carrying element of a slide may be surrounded by a thin cardboard frame. This construction would give a slide a very narrow width or thickness. On the other hand, it is also common to find the picture carrying element of a slide mounted between two glass plates and surrounded by a metal frame. This kind of mounting would increase the width or thickness of the slide to about three times the thickness of a cardboard mounting. Unfortunately when lantern slides are used for demonstration purposes it is not uncommon for the operator of the projector to find an intermingling of slides possessing these varying thicknesses. If a manually operated slide changing device is used there are means presently known for compensating for varying thicknesses of slides. However, if the slides are stored in a magazine or rack and are automatically fed into the slide transfer member it frequently happens that more than one slide at a time is carried to the projection opening.

The present invention eliminates this difficulty by providing an adjustable slide stop plate member which increases or decreases the distance a slide may be delivered into the slide transfer member. The adjustment made to the stop plate member depends upon the thickness of the particular slide to be projected. The invention also includes an ejection mechanism for removing slides from the transfer member on its retractive movement away from the projection position. The present invention makes possible the automatic feeding and projection of slides even though they may vary in thickness by the use of a single slide changing device.

One object of the invention is to provide a device for continuous feeding of varying thickness slides one at a time into a slide transfer member.

Another object of the invention is to provide opposed magazine trays for holding slides of varying thicknesses before and after projection which can be refilled or emptied without interrupting the continuity of projection.

A further object of the invention is to provide a slide transfer member which will extract one slide at a time from the injection magazine, regardless of the slide's thickness, carry it to the projection position on the forward stroke and eject the slide into the ejection magazine on the retractive stroke.

A still further object of this invention is to provide a linking mechanism between the slide transfer member and a power-actuated means for automatically reciprocating the slide transfer member.

A still further object of the invention is to provide a slide changing device which can be used with standard-type projectors.

With the above in mind other objects and advantages of the invention will become apparent from the following description taken in conjunction with the accompanying drawings in which:

Fig. 1 is a top plan view of the device of the present invention shown in conjunction with a projector.

Fig. 2 is a front plan view of the ejection side of the device of the present invention with a slide in the projection position.

Fig. 3 is a rear plan view of the injection side of the device of the present invention with a slide in the projection position.

Fig. 4 is a side plan view of the present invention showing the ejection and injection magazine racks.

Fig. 5 is a section along line 5—5 of Fig. 4 showing the linking mechanism connecting the slide transfer member and motor.

Fig. 6 is a front elevation of the slide frame with the slide transfer member in the projection position.

Fig. 7 is a longitudinal section along line 7—7 of Fig. 6 with a slide in projection position.

Fig. 8 is a longitudinal section along line 7—7 of Fig. 6 with a slide being ejected.

Fig. 9 is a longitudinal section along line 7—7 of Fig. 6 with a slide in the receiving opening and an ejected slide in the ejection magazine.

Fig. 10 is a longitudinal section similar to Fig. 9 showing the adjustable stop means in a position to admit a thin slide into the receiving opening.

Fig. 11 is a vertical section along line 11—11 of Fig. 6 the coupling between the slide transfer member and the projection position shutter plate.

Fig. 12 is a rear elevation of the receiving opening and adjustable stop plate.

Fig. 13 is a perspective view of the slide transfer member.

Fig. 14 is a perspective view of the projection opening shutter plate.

Briefly described the present invention comprises an injection magazine for holding slides of varying thicknesses which are delivered to a receiving aperture in a frame extending transversely to the magazine. Slidable within the frame is a transfer member which carries the slide from the receiving aperture to a projection aperture. When the slide is before the projection aperture the transfer member is in a projection position. Upon retractive movement of the slide transfer member the slide is automatically ejected into an ejection magazine and another slide is injected through the receiving aperture. Slidably attached to the frame is an adjustable stop plate which has limited cooperative transverse and longitudinal movement. The adjustable stop plate faces the receiving aperture. This stop plate may be moved toward or away from the plane of the receiving aperture a predetermined distance equal to the thickness of the slides being delivered into the receiving aperture thus allowing the entry of only one slide at a time into the slide transfer member. The present invention now makes possible the continuous projection of an unlimited number of slides having varying thicknesses.

The preferred embodiment of the invention comprises a slide injection magazine 1 having an elongated horizontal base 2 and vertical side walls 3. Longitudinally slidably attached to the base 2 is a vertical transverse pressure plate 5 having reciprocal motion between a feeding end 4 and an open end 31 of said magazine. The base 2 of the magazine may have raised longitudinal tracks 6 to decrease the resistance between the bottom of the slides and the base as they are delivered to the feeding end of the magazine 4.

The vertical pressure plate embodiment in Fig. 1 has a perpendicular vertical flange 7 extending backwardly and downwardly through base 2. The perpendicular vertical flange 7 is slidably guided on base 2 by key 8 through a hollow longitudinal channel 9 formed in said base. Flange 7 is held within said channel 9 by a plurality of overlapping rivets 11 on the top side of base 2 and by a horizontal plate 12 on the bottom side of said base. Suitable means such as a key 8 may be used to connect horizontal plate 12 to flange 7.

Means are required to urge the pressure plate 5 from the open end toward the feeding end of the injection magazine 1. The embodiment in Fig. 1 has a helical tension spring 13 attached to the horizontal plate 12 of the pressure plate by a hook bolt 14 or the like and extended to some other opposed part of the device 15 where it is suitably attached. The tension thus created in spring 13 constantly urges the pressure plate in a longitudinal direction from the open end 31 toward the feeding end 4, of the magazine 1.

To load the injection magazine the pressure plate is pulled backwardly along the channel 9 against the forward tension of spring 13, a plurality of slides 10 are inserted between the feeding end 4 and the pressure plate 5. When the pressure plate is released the slides inserted within the magazine are directed toward the feeding end 4 by said pressure plate. It can really be seen that as the number of slides in the injection magazine decreases additional slides can be inserted into the magazine without interrupting the continuity of projection. It is not necessary to wait for the slides in the injection magazine to become exhausted before additional slides may be inserted for subsequent projection.

Transversely attached to and extending beyond the injection magazine 1 is a hollow supporting frame 16 comprising a front wall 17, a rear wall 18, a top wall 19, a bottom wall 20 and closed at one end 21.

The rear wall 18 of frame 16 is provided with a slide receiving opening or aperture 22, said aperture extending to the bottom of said rear wall 24 and registering with the injection magazine base 2 and side walls 3. The vertical walls of the slide receiving aperture 22 may be provided with flanged sides 25 extending backwardly and in a juxtaposed position with the vertical side walls 3 of the injection magazine 1. Flat rivets 26 or other suitable means may be used to connect said flanged sides 25 to the injection magazine walls 3. It is preferable for the side walls of the injection magazine to be depressed or identical to accommodate said flange sides 25 and provide a smooth guide surface 28 for slides being urged toward the feeding 4 end of the injection magazine 1. It is also desirable to provide a horizontal flange 29 protruding backwardly and upwardly from the upper edge of the slide receiving aperture 22 to guide any misaligned slides from the injection magazine into said receiving aperture.

Spaced between the slide receiving aperture 22 and the closed end 21 of frame 16 is a slide projection aperture 30. When the frame 16 is positioned within the conventional projector the slide projection aperture 30 is aligned between the light mechanism and lens mechanism of the projector.

The front wall 17 of frame 16 comprises a slide ejection aperture 32 and projection aperture 23. Said projection aperture 23 of the front wall 17 is longitudinally aligned and opposed the projection aperture 30 of the rear wall 18. The slide ejection aperture 32 is sufficiently spaced from the projection aperture away from the closed end 21 of frame 16 to allow the slide to be ejected freely after it has left the projection position. The ejection aperture 32 embodiment shown in Fig. 6 is opposed the receiving aperture 22 and is formed from a section 33 of front wall 17. Said section angularly extending backwardly within said supporting frame 16 and is disconnected from front wall 17 at the top 34 and bottom 35 and on one side 36.

The top 19 and bottom 20 walls are suitably connected to said front and rear walls and close the supporting frame 16, said bottom wall being in the same horizontal plane as the base 2 of injection magazine 1 and acts as a stop member for pressure plate 5.

Registering within supporting frame 16 is a transversely reciprocally slidable slide transfer member 37 comprising a vertical side wall 38, a forwardly extending horizontal top wall 39 and a forwardly extending horizontal bottom wall 40. Side wall 38 is provided with an aperture 27 interrupting said bottom wall 40 and alignable with the projection apertures 23 and 30 when the slide transfer member is extended to the closed end 21 of frame 16 to a projection position and alignable with the slide receiving aperture 22 of the rear side wall 18 when the slide transfer member is extended away from closed end 21 of frame 16 to a slide receiving position.

The projection position vertical side of the transfer member aperture 27 is provided with forwardly extending flange 42. The receiving position vertical side of the slide transfer member aperture 27 is provided with a forwardly extending depression 43. Said forwardly extending flange 42 and depression 43 guide the slide while it is in the receiving aperture 22 to the projection apertures 23 and 30 when the transfer member 37 is longitudinally reciprocated to the projection position and also guide the slide from the projection position into the ejection aperture 32, when the slide transfer member is retracted to the receiving position.

The end of the slide transfer member 37 extending toward the closed end 21 of frame 16 may be provided with a forwardly extending flange 44, said flange is capable of being coupled to a projection aperture shutter plate 45 which will be described later. The other end of said transfer member may be provided with a handle 46 or other suitable means for manually reciprocating the transfer member within the supporting frame 16.

The top 39 and bottom 40 walls of the slide transfer member slide freely between the top 19 and bottom 20 walls of the supporting frame 17 but do not have any "play" or "give." The side wall 38 of said transfer member is in juxtaposition with the rear wall 18 of the supporting frame.

Suitable stop means can be provided to limit the reciprocal movement of the slide transfer 37 member within the supporting frame 16. In the present embodiment the longitudinal reciprocal transverse motion of the transfer member toward the projection position is stopped by the contact of handle 46 with the supporting frame 16 while the retractive movement away from the projection position is stopped by the contact of the vertical flange 42 of the transfer member aperture with the depressed side wall 36 of the ejection aperture 32.

Within the supporting frame 16 is a vertical adjustable slide stop plate 47 lying in a vertical transverse plane parallel to the injection magazine pressure plate 5 and the side wall 38 of the transfer member 37 and facing the receiving aperture 22. Formed at each end of said stop plate 47 are centrally formed rectangular horizontally aligned angular depressions 48 and 49 angling from the injection side inwardly toward the ejection side as shown in Fig. 6.

Angular depression 48 is formed at the end of stop plate 47 at the receiving aperture 22 and provided with a centrally located elongated horizontal guide slot 59 through which is transversely slidable a rivet or pin 50. Said pin being slidably held 51 within the confines of said elongated slot of the angular depression 48 of the stop plate and affixed on the other side 52 to the angularly depressed section 33 of the front wall 17 of the supporting frame 16. The depressed surface 53 of stop plate 47 is aligned and in juxtaposition with the angular depressed section 33 of the front wall which forms the injection aperture.

The other said angular depression 49 centrally formed at the opposite end of slide stop plate 47 is affixed to said plate at one end with a rivet or pin 54 extending forwardly. Rivet 54 is transversely slidable through an elongated horizontal guide slot 55 in an angularly depressed section 58 of the front wall 17 of the supporting frame 16 at the open end 56 of said frame. Said rivet 54 may be provided with a handle 57 for moving pin 54 transversely in said guide slot 55.

The depressed sections in the frame 58 and in the slide stop plate 49 are in juxtaposition with each other and lie in the same vertical angular plane as the depressed section 33 of the front wall 17 of the injection aperture 32. Said rivets or pins 50 and 54 are affixed in relation to their elongated guide slots 55 and 59 in such a manner that they occupy opposite ends of their respective guide slots when moved to their extreme positions.

In Fig. 9 the moving of the handle 57 of rivet 54 to the end of elongated slot 55 in a transverse direction away from the projection position longitudinally slides stop plate 47 angularly away from the receiving aperture 22 along the guide surfaces of angular depressions 49 and 58 of the stop plate and the front wall in the supporting frame. When the stop plate is in the position shown in Fig. 9, the receiving aperture 22 is at its maximum depth and will receive one slide at a time of substantial thickness 61 such as those mounted between two glass plates and surrounded by a metal frame.

In Fig. 10, the moving of the handle 57 of rivet 54 to the end of elongated slot 55 in a transverse direction toward the projection position angularly moves the stop plate 47 toward the receiving aperture 22 limiting the opening of said receiving aperture for thin slides being urged forward from the injection magazine. The receiving aperture in Fig. 10 is at a minimum opening and will receive a slide of narrow thickness 63 such as a slide mounted in a thin cardboard frame.

It can be seen that by the simple transverse manipulation of the slide plate handle 57 quickly and conveniently adjusts the receiving aperture 22 spacing the distance a slide may enter said receiving aperture to the particular thickness of the slide being delivered from the injection magazine.

Suitable means may be provided for automatically ejecting slides through the ejection aperture 32. The embodiment in Figs. 6 and 7 provides a vertical ejection spring plate 64 affixed to the front wall 17 of the supporting frame 16 and has transversely extending flexible spring arms 65 at its top and bottom extending backwardly through the ejection aperture 32 to the rear wall 18 of the supporting frame. Said spring arms 65 press against said rear wall between the receiving aperture 22 and projection aperture 30. Rivets 66 or other means may be used to attach said spring plate 64 to the front wall of the supporting frame.

Within the supporting frame 16 at the top and bottom of the projection aperture 30 are yieldable leaf springs 60 affixed 62 to the front wall 17 of the supporting frame 16 and pressing against the rear wall 18 of said frame. Said yieldable leaf springs hold the slide in the transfer member against the projection aperture 30 in a firm vertical position.

A vertical transverse projection aperture shutter plate 45 may be coupled with the slide transfer member 37 within frame 16 to block the passage of light through the projection apertures 23 and 30 when the transfer member is in the receiving position. Said shutter plate comprising a vertical wall 67 having backwardly extending spaced flanges 68. Said flanges being interposed between the forwardly extending flange 44 of the transfer member 37 and relatively spaced to provide transverse movement of said shutter plate into and out of a blocking position of projection apertures 23 and 30. In Fig. 9 the slide transfer member is in a receiving position and the shutter plate is blocking the projection aperture. In Fig. 7 the slide transfer member is in a projection position and the shutter plate has moved transversely out of the blocking position toward the closed end 21 of frame 16. It will be appreciated that by extending the supporting frame 16 and transfer member 37 transversely beyond the projection position one may also accomplish a blocking of the projection aperture when said transfer member is in a receiving position.

The device may be provided with an ejection magazine 69 longitudinally aligned with the injection magazine 1 and apposed the ejection aperture 32. The ejection magazine 69 may comprise the same embodiment as the injection magazine 1, namely a longitudinal elongated base 70, vertical side walls 71 attached to the front wall 17 of frame 16, a receiving end 72 apposed ejection aperture 32, and a vertical transverse pressure plate 73 capable of longitudinal reciprocal motion, said pressure plate 73 being slidably keyed 74 in hollow longitudinal channel 75 of base 70 and provided with a tension spring 76 to urge said plate 73 toward the receiving end 72 of the ejection magazine 69.

When the slide transfer member is retracted away from the projection position the transversely extending flexible spring arms 65 of vertical spring plate 64 guide the slide out of the transfer member 37 through the ejection aperture 32 into the receiving end 72 of ejection magazine 69. The slides are held within said ejection magazine by pressure plate 73 but may be removed at any time without interrupting the continuity of projection.

The device may be provided with an electric motor 77 or other power-actuated means and suitable gear means connect said motor to a vertical shaft 78, said vertical shaft being flanged at its upper end 79. Flange 79 carries an eccentric pivot 80 and a linking arm 81 connecting said pivot 80 to one end of the slide transfer member 37. Spring means 82 are attached to said linking arm 81 to hold the transfer member 37 in a projection position 31. As shown in Fig. 5 by rotating vertical shaft 78 the linking means 81 moves the slide transfer member 37 from the projection position 31 to the receiving position 41. The tension spring 82 then acts upon linking means 81 to returning the transfer member 37 to the projection position 31.

Having described the invention I claim:

1. A slide changing device for slides of varying thicknesses for use in combination with a projector comprising a transverse hollow frame having one end open, a pair of spaced vertical side walls, a slide receiving aperture within one of said walls, a slide ejecting aperture within the other of said walls, and a projection aperture within said walls transversely spaced from said receiving and ejecting apertures, a slide transfer member transversely slidable within said hollow frame for transferring slides from the receiving aperture to the projecting aperture, a longitudinally movable vertical stop plate within said frame and aligned with said receiving aperture, said stop plate having a flat surface at said aperture and angled at one end, said angled end being provided with an elongated horizontal guide slot, a pin having a handle within said slot and cooperating with said frame whereby transverse movement of said angled end shifts said flat surface of said stop plate longitudinally towards or away from said receiving aperture to limit the longitudinal forward distance a slide may enter said receiving aperture, slide injection and ejection magazines longitudinally aligned with said receiving and ejection apertures and pressure means associated with said injection magazine to propel slides towards said vertical slide stop plate.

2. A slide changing device for slides of varying thicknesses for use in combination with a projector comprising a transverse hollow frame having one end open, a pair of spaced side walls, a slide receiving aperture formed in one of said walls, a slide ejecting aperture formed in the other of said walls, and an aligned projection aperture formed in said walls transversely spaced from said receiving and ejecting apertures, a slide transfer member reciprocally slidable within said hollow frame through said open end, said transfer member having a slide holding aperture alignable with said receiving aperture and said projection aperture, a longitudinal slide injection magazine attached to said frame having a feeding end aligned with said receiving aperture, pressure means associated with said slide injection magazine to deliver slides toward said receiving aperture, a vertical slide stop plate within said frame, aligned with said receiving aperture, said stop plate being provided with a flat surface at said receiving aperture and having a forwardly extending angled section at one end, said frame having a rearwardly angled section adjacent said ejection aperture aligned with said stop plate angled section, aligned horizontal guide slots in said angled sections, a slidable pin having a handle within said slots and affixed to said angled stop plate section whereby transverse movement of said handle within said horizontal guide slots at said angled sections imparts lonigtudinal movement of said flat surface of said stop plate towards or away from said receiving aperture to limit the longitudinal depth of said receiving aperture.

3. A slide changing device for slides of varying thicknesses for use in combination with a projector comprising a transverse hollow frame having one end open, a pair of spaced vertical side walls, a slide receiving aperture formed in one of said walls, an apposed slide ejecting aperture formed in the other of said side walls, and an aligned projection aperture formed in said walls and transversely spaced from said receiving and ejecting apertures, a slide transfer member reciprocally slidable within said hollow frame and through said open end, said transfer member having a slide holding aperture alignable with said receiving aperture and said projection aperture, a slide injection and ejection magazine attached to said frame longitudinally aligned with said receiving aperture and said ejecting aperture, pressure means within said slide injection magazine to deliver slides in said magazine toward said receiving aperture, means within said frame for ejecting slides from said slide transfer member through said ejection aperture into said ejection magazine, a longitudinally movable vertical stop plate within said frame and aligned with said receiving aperture, said stop plate having a flat surface at said aperture and angled at one end, said angled end being provided with an elongated horizontal guide slot, a pin having a handle within said slot and cooperating with said frame whereby transverse movement of said angled end shifts said flat surface of said stop plate longitudinally towards or away from said receiving aperture to limit the longitudinal forward distance each successive leading slide delivered from said injection magazine may enter said receiving aperture.

4. A slide changing device for slides of varying thicknesses for use in combination with a projector comprising a transverse tubular frame having one end open, a pair of spaced vertical side walls with aligned apertures defining a projection position, a slide receiving aperture within one of said walls spaced from the projection aperture, a slide ejection aperture within the other of said walls spaced from the projection aperture, a slide transfer member reciprocally slidable within said hollow frame having an opening therein adapted to be aligned with said projection aperture and with said receiving and ejection apertures, a shutter member movable with said transfer member into and out of a light blocking position at the projection aperture, a longitudinal slide injection magazine attached to said frame and having a feeding end, said feeding end aligned with said slide receiving aperture, pressure means longitudinally slidable in said magazine for delivering slides therein through said slide receiving aperture to the transfer member, a vertical slide stop plate aligned with said receiving aperture, said stop plate being provided with a flat surface at said receiving aperture and having a forwardly extending angled section at one end, said frame having a rearwardly angled section adjacent said ejection aperture aligned with said stop plate angled section, aligned horizontal guide slots in said angled sections, a slidable pin having a handle within said slots and affixed to said angled stop plate section whereby transverse movement of said handle within said horizontal guide slots at said angled sections imparts longitudinal movement of said flat surface of said stop plate towards or away from said receiving aperture to limit the extent of forward movement of each successive leading slide delivered from said injection magazine into said transfer member and to prevent delivery of more than one slide at a time by the transfer member to the projection aperture, a longitudinal ejection magazine aligned with said ejection aperture, guide means within said frame for diverting each successive slide to said ejection magazine after projection.

5. A slide changing device for slides of varying thicknesses for use in combination with a projector comprising a transverse hollow frame having one end open, a pair of spaced vertical side walls, a slide receiving aperture formed in one of said walls, an apposed slide ejecting aperture formed in the other of said side walls, and an aligned projection aperture formed in said walls and transversely spaced from said receiving and ejecting apertures, a slide transfer member reciprocally slidable within said hollow frame and through said open end, said transfer member having a slide holding aperture adapted to be aligned with said receiving aperture and said projection aperture, a shutter member movable with said transfer member into and out of a lock blocking position at said projection aperture, power actuated means operatively connected to said transfer member to impart transverse reciprocal motion thereto, a longitudinal slide injection magazine attached to said frame having a feeding end aligned with said receiving aperture, a vertical pressure plate longitudinally slidable within said slide injection magazine, spring means to force said pressure plate toward said receiving aperture, a longitudinal slide ejection magazine attached to said frame having a receiving end aligned with said ejection aperture, a vertical ejection spring plate adjacent said ejection aperture having transversely extending arms within said frame adapted to engage the leading edge of a slide being moved by said transfer member from a position adjacent the projection aperture and to direct said slide toward the ejection aperture, a longitudinally movable vertical stop plate within said frame and aligned with said receiving aperture, said stop plate having a flat surface at said aperture and angled at one end, said angled end being provided with an elongated horizontal guide slot, a pin having a handle within said slot and cooperating with said frame whereby transverse movement of said angled end shifts said flat surface of said stop plate longitudinally towards or away from said receiving aperture to limit the longitudinal forward movement of each successive leading slide delivered from said feeding end of said injection magazine into the receiving aperture.

6. A slide changing device for slides of varying thicknesses for use in combination with a projector comprising a transverse tubular frame having one end open, a pair of spaced vertical side walls with aligned apertures defining a projection position, and a slide receiving aperture within one of said walls spaced from the projection aperture, a slide ejection aperture within the other of said walls spaced from the projection aperture, a slide transfer member reciprocally slidable within said hollow frame having an opening therein adapted to be aligned with said projection aperture and with said receiving and ejection apertures, a shutter member movable with said transfer member into and out of a light blocking position at the projection aperture, power-actuated means operatively connected to said transfer member to impart transverse reciprocal motion thereto, a longitudinal slide injection magazine attached to said frame and having a feeding end, said feeding end aligned with said slide receiving aperture, a vertical pressure plate longitudinally slidable within said magazine, spring means attached to said pressure plate for delivering slides within said magazine through said slide receiving aperture to the transfer member, a longitudinally movable vertical stop plate within said frame and aligned with said receiving aperture, said stop plate having a flat surface at said aperture and angled at one end, said angled end being provided with an elongated horizontal guide slot, a pin having a handle within said slot and cooperating with said frame whereby transverse movement of said angled end shifts said flat surface of said stop plate longitudinally towards or away from said receiving aperture to limit the longitudinal forward movement of each successive leading slide delivered from said injection magazine into said transfer member and to prevent delivery of more than one slide at a time, and a vertical ejection spring plate adjacent said ejection aperture adapted to engage the leading edge of a slide being moved by said transfer member from a position adjacent the projection apertures and to direct said slide towards the ejection aperture slides moving from the projection aperture through said ejection aperture.

7. A slide changing device for slides of varying thicknesses for use in combination with a projector comprising a transverse hollow frame having one end open, a pair of spaced vertical side walls, a slide receiving aperture formed in one of said walls, an apposed slide ejecting aperture formed in the other of said side walls, and an aligned projection aperture formed in said walls and transversely spaced from said receiving and ejecting apertures, a slide transfer member reciprocally slidable within said hollow frame and through said open end, said transfer member having a vertical side wall, and horizontal top and bottom walls and a slide holding aperture formed within said vertical side wall, said aperture alignable with said receiving aperture and said projection aperture when said transfer member is reciprocated within said frame, a shutter member movable with said transfer member into and out of a lock blocking position at said projection aperture, power-actuated means operatively connected to said transfer member to impart transverse reciprocal motion thereto and means for exciting said power-actuating means, a longitudinal slide injection magazine having a horizontal base and vertical side walls attached to said frame having a feeding end aligned with said receiving aperture, a vertical pressure plate longitudinally slidable on said base, spring means attached to said pressure plate for delivering slides within said magazine through said receiving aperture to the transfer member, a longitudinal slide ejection magazine having a horizontal base and vertical side walls attached to said frame and aligned with said ejection aperture, a vertical ejection spring plate attached to the front wall of said frame and extending angularly toward the rear wall of said frame at said ejection aperture having transversely extending arms within said frame toward said projection aperture and against said rear wall adapted to engage the leading edge of a slide being removed by said transfer member from a position adjacent the projection apertures and to direct said slide to the ejection aperture, a vertical stop plate within said frame aligned with said receiving aperture, said stop plate being provided with a flat surface at said receiving aperture and having a forwardly extending angled section at one end, said frame having a rearwardly angled section adjacent said ejection aperture aligned with said stop plate angled section, aligned horizontal guide slots in said angled sections, a slidable pin having a handle within said slots and affixed to said angled stop plate section whereby transverse movement of said handle within said horizontal guide slots at said angled sections imparts longitudinal movement of said flat surface of said stop plate towards or away from said receiving aperture to limit the extent of forward movement of each successive leading slide delivered from said feeding end of said injection magazine into the slide receiving aperture and transfer member aperture and to prevent the delivery of more than one slide at a time by the transfer member to the projection aperture, leaf spring means at said projection aperture to hold slides in a fixed vertical projection position at said aperture.

References Cited in the file of this patent
UNITED STATES PATENTS

| | | |
|---|---|---|
| 2,427,164 | Stechbart | Sept. 9, 1947 |
| 2,513,102 | Parlini et al. | June 27, 1950 |
| 2,583,442 | Parlini et al. | Jan. 22, 1952 |
| 2,732,758 | Waller | Jan. 31, 1956 |